United States Patent
Lee

(10) Patent No.: US 6,934,385 B2
(45) Date of Patent: *Aug. 23, 2005

(54) APPARATUS OF A DIGITAL ECHO CANCELLER AND METHOD THEREFOR

(75) Inventor: Claymens Lee, Kaohsiung Hsien (TW)

(73) Assignee: Topic Semiconductor Corp., Hsinchu (TW)

( * ) Notice: Subject to any disclaimer, the term of this patent is extended or adjusted under 35 U.S.C. 154(b) by 552 days.

This patent is subject to a terminal disclaimer.

(21) Appl. No.: 09/811,868

(22) Filed: Mar. 19, 2001

(65) Prior Publication Data

US 2002/0101983 A1 Aug. 1, 2002

(30) Foreign Application Priority Data

Dec. 8, 2000 (TW) ........................... 89126182 A

(51) Int. Cl.⁷ .................... H04M 9/08; H04B 3/20
(52) U.S. Cl. .................... 379/406.01; 379/406.01; 379/406.02; 379/406.06; 370/286; 370/293
(58) Field of Search .................... 379/406.01, 406.05, 379/406.06, 406.08, 406.12, 406.16; 370/286, 289, 290, 293

(56) References Cited

U.S. PATENT DOCUMENTS

| | | | | |
|---|---|---|---|---|
| 4,805,215 A | * | 2/1989 | Miller | 379/406.08 |
| 5,388,092 A | * | 2/1995 | Koyama et al. | 370/289 |
| 5,475,731 A | * | 12/1995 | Rasmusson | 379/3 |
| 5,940,455 A | * | 8/1999 | Ikeda | 375/350 |
| 6,421,377 B1 | * | 7/2002 | Langberg et al. | 375/222 |
| 6,477,200 B1 | * | 11/2002 | Agazzi et al. | 375/233 |
| 6,804,204 B2 | * | 10/2004 | Lee et al. | 370/286 |

* cited by examiner

*Primary Examiner*—Binh Tieu
*Assistant Examiner*—Tuan Pham
(74) *Attorney, Agent, or Firm*—J.C. Patents

(57) ABSTRACT

An apparatus of a digital echo canceller comprises a first-set delay circuits, a selector, a second-set delay circuits, a plurality of multipliers and an adder. The first-set delay circuits are arranged into groups, and each group has N delay circuits. An exhaustive search function is carried out to produce a plurality of energy sums. The selector will select the biggest energy sum to serve as a significant part and then transmit to the outputs of the second-set delay circuits, the multipliers and the adder. An estimated echo signal is produced to cancel the echo signal.

6 Claims, 4 Drawing Sheets

APPARATUS OF A DIGITAL ECHO CANCELLER AND METHOD THEREFOR

CROSS-REFERENCE TO RELATED APPLICATION

This application claims the priority benefit of Taiwan application Ser. No. 89126182, filed Dec. 8, 2000.

BACKGROUND OF THE INVENTION

1. Field of Invention

The present invention relates generally to a method and apparatus of a digital echo canceller. More particularly, the present invention relates to a method and apparatus of a digital echo canceller that only responds to echo signals to perform a multiplication-and-addition function.

2. Description of the Related Art

FIG. 1 illustrates a performance of a full-duplex digital transceiver. Both ends of the full-duplex digital transceiver are connected to a cable 22. Each end of the full-duplex digital transceiver has a transceiver 18 or 20. The transceiver 18 at the left end of the full-duplex digital transceiver comprises a transmitter (TX) 12, a receiver (RX) 14 and a hybrid circuit 16. The transmitter 12 and the receiver 14 are connected to the hybrid circuit 16 to receive and transmit signals.

If the transceiver 18 at the left end of the full-duplex digital transceiver is used as a near-end transceiver, the other transceiver at the right end will be a far-end transceiver. When the transmitter 12 transmits a signal to the far-end of the full-duplex digital transceiver 20, the transmitter will often not match the impedance of the far-end full-duplex digital transceiver 20 due to a transmitting cable 22. A far-end echo signal that will transmit to the near-end of the full-duplex digital transceiver 16 influences the received signal of the receiver 14. An interfering noise will occur.

To prevent the above-mentioned state from occurring, the conventional method will require designing a canceller to eliminate the echo signals. The structure illustrated in FIG. 2 is an adaptive finite impulse response digital echo canceller (adaptive FIR digital echo canceller). Xn signals are transmitted to a plurality of delay circuits D. After receiving the Xn signals, an output of each delay circuit D produces a signal. These signals are multiplied respectively to a plurality of significant coefficients $C_0, C_1, C_2, \ldots C_{N-2}, C_{N-1}$ to produce multiplied values. These multiplied values are then added together to produce a sum (the sum $\Sigma$ is shown on the FIG. 2). An estimated echo signal is thus produced to eliminate the interference noise.

The above mentioned structure transmits signals utilizing a longer transmitting cable and a higher frequency (for example, a gigabit ethernet case, at the sample rate of 125 Mhz) to produce an echo signal's length that is shown in FIG. 3. The length of the echo signal is approximately 80 EC taps long. When the length of the echo signal is longer, the number of significant coefficients $C_0, C_1, \ldots C_{N-2}, C_{N-1}$ that multiply respectively to the signals transmitted by the delay circuits D of FIG. 2 will increase. As a result, the amount of addition and multiplication operations that have to be calculated will also increase. The whole operation is not only complex, but the cost of the hardware is also high.

SUMMARY OF THE INVENTION

According to above, the present invention provides an installation of a digital echo canceller and method therefor.

It is an object of the present invention to perform a multiplication-and-addition functions according to an echo part that relates to an echo signal so that an unnecessary circuit design can be omitted.

The present invention provides an installation of a digital echo canceller. The digital echo canceller is suitable for a full-duplex digital transceiver to eliminate an echo signal that is produced by the full-duplex digital transceiver.

The receiver of the full-duplex digital transceiver is connected to a first receiving end and a second receiving end by a cable. The first receiving end produces an input signal.

The structure of the present invention comprises a plurality of first-set delay circuits, a selector, a plurality of second-set delay circuits, a plurality of multipliers and an adder. The plurality of first-set delay circuits comprise an input and an output, wherein the input and the output are connected in series. An input signal that is received by a first input is transmitted out from the full-duplex digital transceiver. First-set delay circuits are arranged into groups, and each group has N delay circuits. The selector comprises an input and an output. The input of the selector is according to an exhaustive search to select any set of delay circuits' outputs for connection. A plurality of second-set delay circuits comprise an input and output, wherein the input and the output are connected in series. The first input is connected to the output of the selector. The number of the multipliers is the same as the number of the second-set of the delay circuits. The multipliers are connected respectively to each output of the second-set delay circuits. Each of these multipliers are multiplied respectively to an EC coefficient to produce signals. An adder will receive all these signals that are produced from the multipliers and add these values together to produce a sum, wherein the sum is an estimated echo signal that will cancel the echo signal.

The exhaustive search function is according to the energy sum that is produced by each set of delay circuits. The largest energy sum of the delay circuits' set is selected to connect its output to the selector. The energy sum can be calculated by a formula $$E(s) = \sum_{i=1}^{N_s} ci^2(s),$$

wherein $E(s)$ is the EC energy sum, $Ci(s)$ is the EC coefficient and $N_s$ is the response number of the echo signal and the $N_s$ number is same as the number of the second-set of delay circuits. The response number is 20 for example.

It is one object of the present invention to provide a method of a digital echo canceller to cancel an echo signal. This method is suitable for a full-duplex digital transceiver. A first receiving end is connected to a second receiving end by a cable. The input signal is transmitted by the first receiving end.

In order to determine the significant part of echo signals, the searching steps comprise: (a) the total number of search S can be calculated from an equation $$S = \frac{N_{is,max}}{\Delta N},$$

wherein the largest response number of the insignificant part of the response signal is $N_{is,max}$, and $\Delta N$ is an incremental number. $N_{is,max}$ is found first; then the value $\Delta N$ is determined from the value of $N_{is,max}$. Once these two values are known, the total number of searching S can be calculated.

(b) an equation $N_{is}(s)=s*\Delta N$ is used to search for a starting point of the echo response, wherein $\Delta N$ is assumed to be 10 and the value of s starts from 0. Once the starting point of the echo response $N_{is}(s)$ is found, the response number of searching $N_s$ can be determined. The $N_s$ value is used to calculate the energy sum of EC from an energy equation $$E(s) = \sum_{i=1}^{N_s} ci^2(s),$$

wherein E(s) is the energy sum of EC, and Ci(s) is the EC coefficient.

(c) the value of S that is calculated in step (a) is used as a reference to determine the value of s. In order to get s=S, the calculation process has to repeat step (b) until s=S and $N_{is}(s)=N_{is,max}$.

(d), the largest energy sum that is calculated during each searching is chosen for the significant part.

(e), finally the values of the significant part are multiplied to corresponding correlation coefficients. The results of this multiplication operation are then added together to give an estimated echo signal that will cancel the echo signal. From the above-mentioned, the value of $\Delta N$ is set at 10, and the value of $N_s$ is set at 20, for example.

It is to be understood that both the forgoing general description and the following detailed description are exemplary, and are intended to provide further explanation of the invention as claimed.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The conventional structure of a digital echo canceller utilizes a longer transmitting cable and a higher frequency; therefore, the amount of multiplication and addition operations between the significant coefficients and the signals that are produced by the delay circuits increases. As a result the whole operation becomes complex and the cost of the hardware increases.

Figure 3:
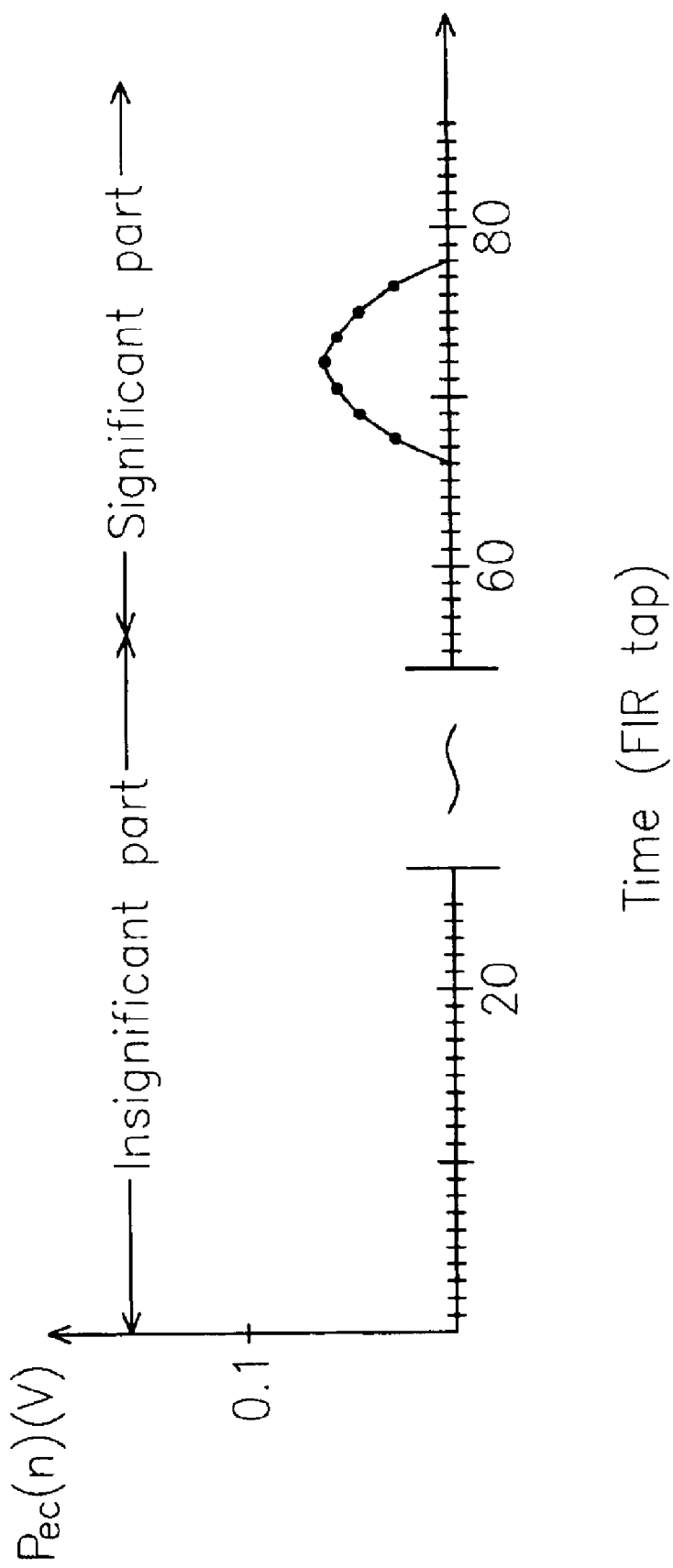
FIG. 3 is a graph of the distribution of the echo signal.

According to the above-mentioned disadvantage, a method can be obtained from FIG. 3 to improve the conventional structure. FIG. 3 illustrates a graph of the echo signal distribution. According to the average calculation, the values of 10 cycles are normally used but in order to reduce the deviation, an extra 10 cycles (from the first part and the last part) are taken into account for the calculation. The results that we obtained from the calculation can be divided into two parts, wherein the front part is an insignificant part and the latter part is a significant part.

The method of the present invention of a digital echo canceller is to connect from a first receiving end of the full-duplex digital transceiver to its second receiving end by using a cable. The steps of this connecting process comprise:

(a) $N_{is,max}$ is the largest response number of the insignificant part of the response signal that shows in FIG. 3 of the insignificant part of echo signals, we will therefore set the value of $N_{is,max}$ at 60. $\Delta N$ is an incremental number, wherein we set the value at 10, for example. The total number of search S can be calculated from an equation $$S = \frac{N_{is,max}}{\Delta N}, S = 60/10 = 6.$$

(b) an equation $N_{is}(s)=s*\Delta N$ is used to search for a starting point of the echo response, wherein $\Delta N$ is set to be 10 and the value of s starts from 0. Once the starting point of the echo response $N_{is}(s)$ is found, the response number of searching $N_s$ can be determined. From FIG. 3, we use 10 cycles of the echo signal distribution, but in order to have a more acutely value an extra 10 cycles are taken from the first part and the last part of the distribution. Therefore, the $N_s$ value is set at 20. The $N_s$ value is used to calculate the energy sum of EC from an energy equation $$E(s) = \sum_{i=1}^{N_s} ci^2(s),$$

wherein E(s) is the energy sum of EC, and Ci(s) is the EC coefficient. In general, in the insignificant part of the echo signal distribution, the value of Ci(s) is usually very small, and the E(s) that is calculated is almost 0. The E(s) value starts to become larger when the echo signal distributes at the significant part.

(c) the value of S that is calculated in step (a) is used as a reference to determine the value of s. In order to get s=S, the calculation process has to repeat step (b) until s=S and $N_{is}(s)=N_{is,max}$. The total number of searching is S+1, and each energy sum E(s) is calculated.

(d) the largest energy sum that is calculated during each searching is selected for the significant part.

(e) the selected values of the significant part are multiplied to corresponding correlation coefficients. The results of this multiplication operation are then added together to give an estimated echo signal that will cancel the echo signal.

Figure 4:
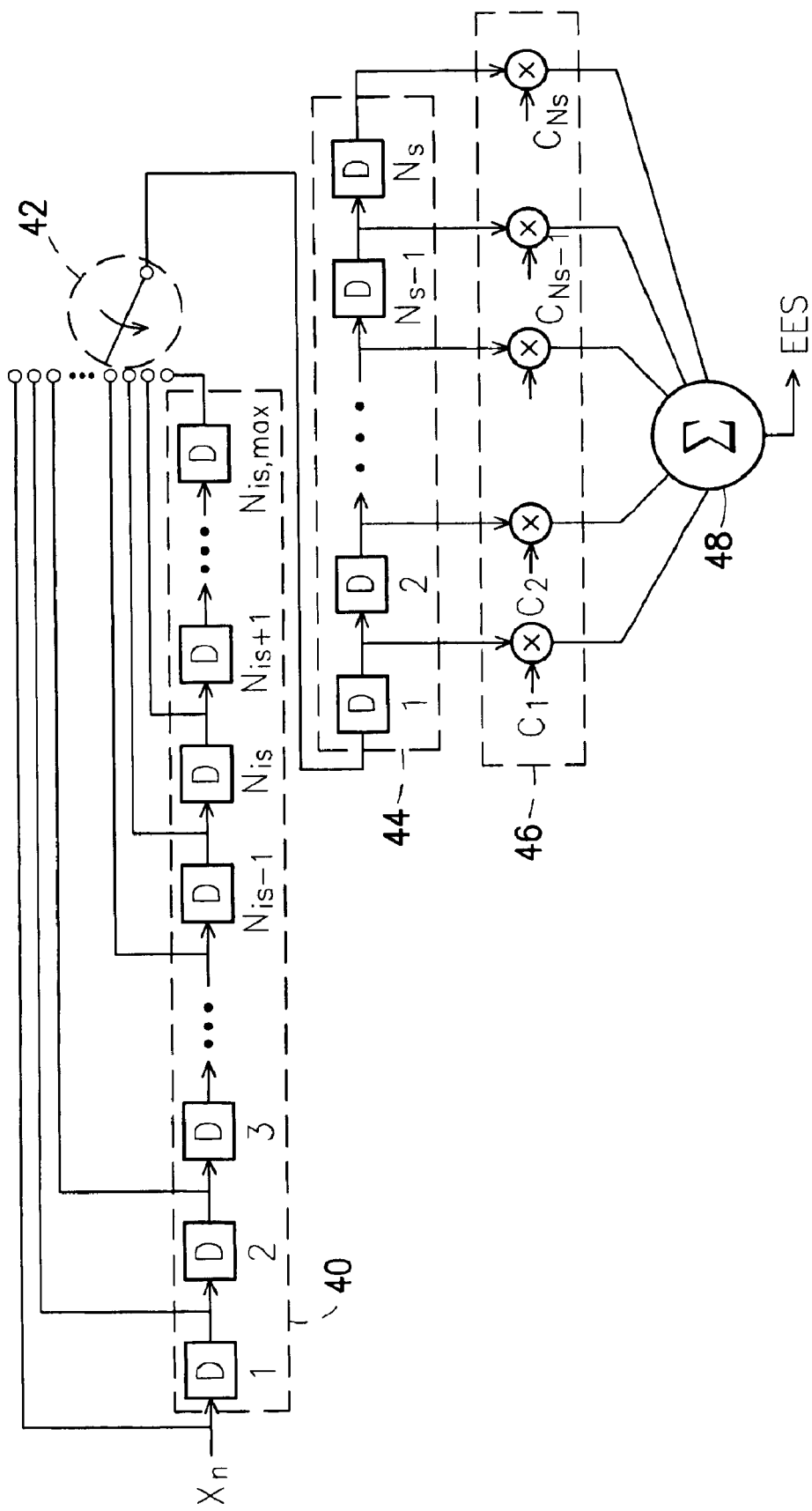
FIG. 4 is a diagram that illustrates an apparatus of a digital echo canceller according to a preferred embodiment of the present invention.

FIG. 4 is a diagram that illustrates an apparatus of a digital echo canceller according to a preferred embodiment of the present invention. The digital echo canceller that is suitable for a full-duplex digital transceiver (shown in FIG. 1) is used to cancel the echo signal.

Figure 1:
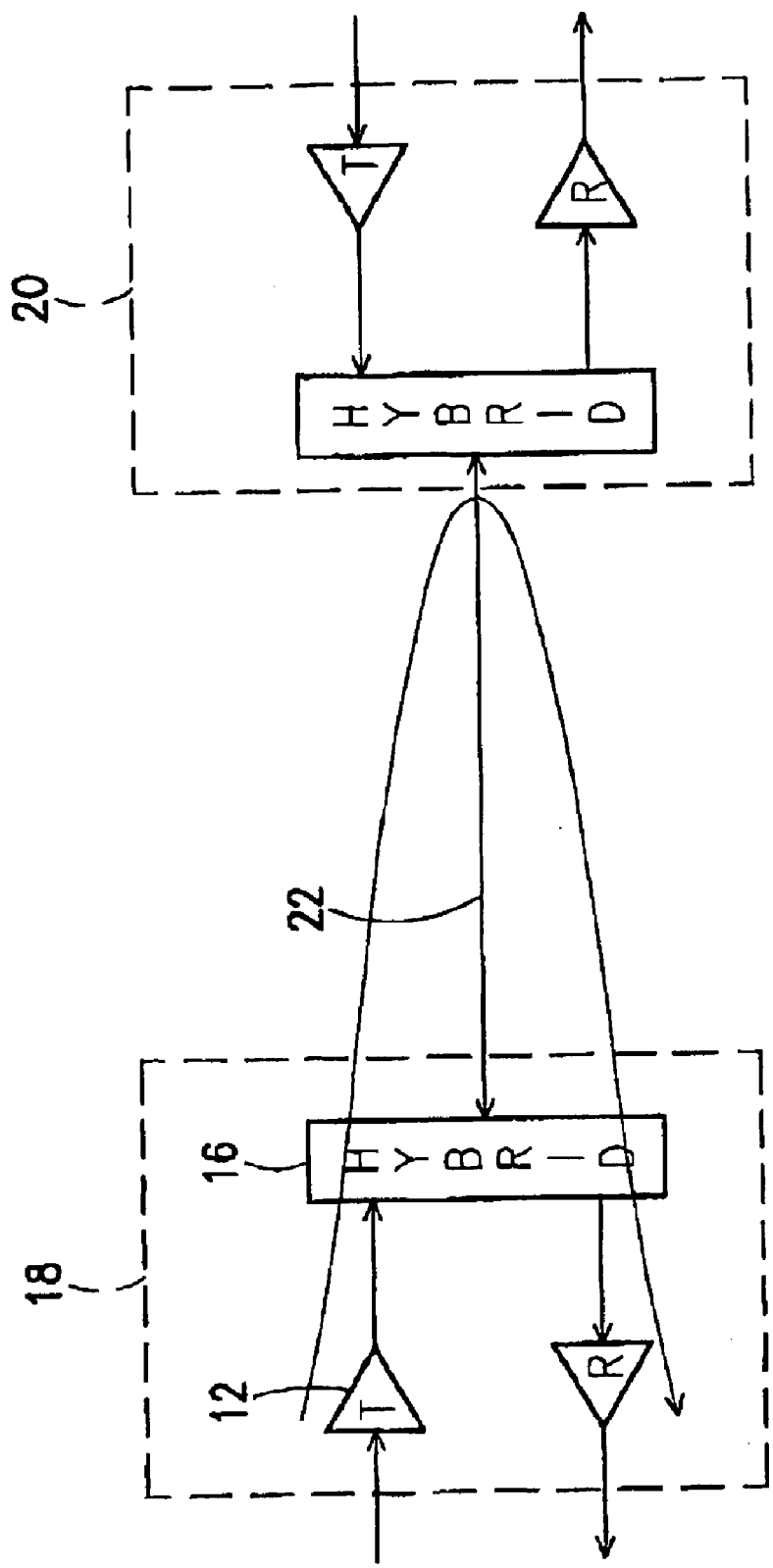
FIG. 1 is a diagram that illustrates a performance of a full-duplex digital transceiver.
Figure 2:
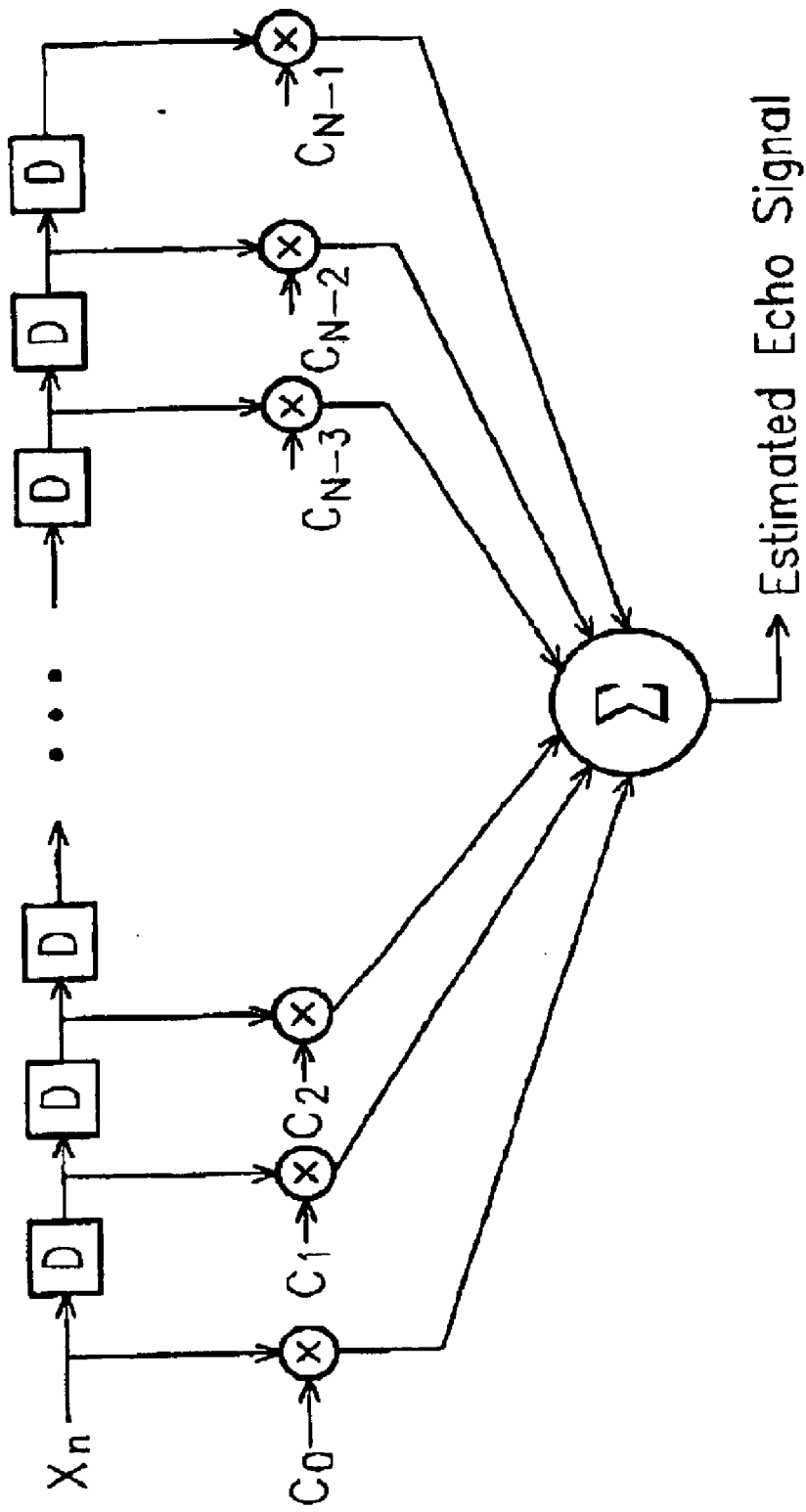
FIG. 2 is a diagram that illustrates a structure of an adaptive FIR digital echo canceller.

The canceller comprises a plurality of first-set delay circuits 40, a selector 42, a plurality of second set delay circuits 44, a plurality of multipliers 46 and a adder 48. The plurality of first-set delay circuits 40, each has an input and an output and are connected in series. The first input receives an input signal that is transmitted by the full-duplex digital transceiver (Ref. FIG. 1). The first-set delay circuits are arranged in groups and each group has N delay circuits. FIG. 4 shows the first group of the first-set delay circuits 50 is from number 1 to number $\Delta N$, and second group 52 is from $\Delta N+1$ to $2\Delta N$.

The input of the selector 42 is used for searching and it selects to connect any one of the output of the first-set delay circuits. The searching function depends on the plurality of energy sums are produced from the first-set delay circuits (for example 50 and 52 in FIG. 4), the energy equation is $$E(s) = \sum_{i=1}^{N_s} ci^2(s),$$

wherein E(s) is the energy sum of EC, and Ci(s) is the EC coefficient. $N_s$ is the response number of the echo signal and the number of $N_s$ is the same as the number of second-set of delay circuits, and the number of $N_s$ is set at 20, for example.

The first-set delay circuits can be designed into a simple circuit (not shown in the diagram). The selector will the select the largest energy sum of an output of the first-set delay circuits to use for the significant part, and the selected output of the delay circuit is connected to the input of the selector 42.

The second-set delay circuits 44 are connected in series. The output of the selector 42 is connected to the input of the second-set delay circuits. The multipliers 46 have the same number as the second-set circuits 44. A plurality of correlation coefficients will be received by the multipliers when the signals are produced from the outputs of the second-set circuits. These signals are multiplied respectively to the correlation coefficients. The results are the added together by a adder to produce an estimated echo signal (ESS). The estimated echo signal is used to cancel the echo signal.

According to above, the present invention provides an apparatus of a digital echo canceller and method therefor. It is an object of the present invention to perform a multiplication-and-addition functions according to an echo part that relates to an echo signal so that an unnecessary circuit design can be omitted. The cost of the hardware can be reduced.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus of a digital echo canceller that is suitable to use on a full-duplex digital echo transceiver and is used to cancel a produced echo signal, the apparatus comprises:

a plurality of first-set delay circuits installed, wherein each delay circuit has an input and an output, and are all connected in series, and the first input receives an input signal that transmitted from the full-duplex digital transceiver, and the first-set delay circuits are arranged in groups and each group has N delay circuits;

a selector with an input and an output, wherein the input is based on an exhaustive search that chooses to connect to one the outputs of the first delay circuits;

a plurality of second-set delay circuits, wherein each circuit has an input and an output and are all connected in series, and the first input is connected to the output of the selector;

a plurality of multipliers wherein the number of the multipliers is the same as the number of the second-set delay circuits, and the multipliers are connected respectively to the outputs of the second-set delay circuits, and the transmitting signals from the second-set delay circuits are multiplied respectively to correlation coefficients;

an adder that adds the results from the multiplication operation together to produce an estimated echo signal, wherein the estimated echo signal cancels the echo signal.

2. The apparatus of claim 1, wherein the exhaustive search function depends on a largest energy sum that is produced from the outputs of each group of delay circuits to select an output to connect to the selector.

3. The apparatus of claim 2, wherein the energy sum is calculated from an equation $$E(s) = \sum_{i=1}^{N_s} ci^2(s),$$

wherein E(s) is an energy sum of EC, and Ci(s) is an EC coefficient, $N_s$ is the response number of the echo signal and a value of $N_s$ is the same as the number of second-set delay circuits.

4. The apparatus of claim 3, wherein the value of $N_s$ is set at 20.

5. A method of a digital canceller that is suitable for a full-duplex digital transceiver and is used to cancel an echo signal, with a first receiving end connected to a second receiving end by a cable, and the first receiving end transmits an input signal, the steps of the method comprise:

(a) calculating total number of searching S by using a $N_{is,max}$ value and a $\Delta N$ value, wherein $N_{is,max}$ is the largest response number of the insignificant part of the response signal and $\Delta N$ is an incremental number, $N_{is,max}$ found first; the value $\Delta N$ is determined from the value of $N_{is,max}$, and once these two values are known, the total number of searching S can be calculated;

(b) using an equation $N_{is}(s)=s*\Delta N$ to search for a starting point of the echo response, wherein $\Delta N$ is assumed to be 10 and the value of s starts from 0, and once the starting point of the echo response $N_{is}(s)$ is found, the response number of searching $N_s$ can be determined; the $N_s$ value is used to calculate the energy sum of EC from an energy equation $$E(s) = \sum_{i=1}^{N_s} ci^2(s),$$

wherein E(s) is the energy sum of EC, and Ci(s) is the EC coefficient;

(c) calculating the value of S in step (a) and using the S value as a reference to determine the value of s in order to get s=S, the calculation process has to repeat step (b) until s=S and $N_{is}(s)=N_{is,max}$;

(d) calculating the largest energy sum during each searching is chosen for the significant part;

(e) multiplying the values of the significant part to corresponding correlation coefficients, and the results of this multiplication operation are then added together to give an estimated echo signal that will cancel the echo signal.

6. The method of claim 5, wherein the value of $\Delta N$ is set at 10, and the value of $N_s$ is set at 20.

* * * * *